(12) United States Patent
Ellison et al.

(10) Patent No.: US 10,729,261 B2
(45) Date of Patent: Aug. 4, 2020

(54) BOWL AND METHOD OF FORMING A BOWL

(71) Applicant: YETI Coolers, LLC, Austin, TX (US)

(72) Inventors: Kyle Ellison, Austin, TX (US); Dustin Bullock, Austin, TX (US); Colin Darling, Austin, TX (US)

(73) Assignee: YETI Coolers, LLC, Austin, TX (US)

( * ) Notice: Subject to any disclaimer, the term of this patent is extended or adjusted under 35 U.S.C. 154(b) by 42 days.

(21) Appl. No.: 16/146,692

(22) Filed: Sep. 28, 2018

(65) Prior Publication Data

US 2020/0100607 A1 Apr. 2, 2020

(51) Int. Cl.
*A01K 5/01* (2006.01)
*A47G 19/02* (2006.01)

(52) U.S. Cl.
CPC ............ *A47G 19/02* (2013.01); *A01K 5/0114* (2013.01)

(58) Field of Classification Search
CPC ..... A47G 19/02; A01K 5/0114; A47J 41/0072
USPC ........................ 220/592.27, 62.11; 119/61.54
See application file for complete search history.

(56) References Cited

U.S. PATENT DOCUMENTS

| | | | |
|---|---|---|---|
| 2,545,733 A * | 3/1951 | Hatfield | A47G 19/027 220/574.2 |
| 2,816,589 A | 12/1957 | Tupper | |
| 3,307,602 A | 3/1967 | Boster | |
| 3,391,847 A | 7/1968 | Pierce et al. | |
| 4,471,880 A | 9/1984 | Taylor et al. | |
| 4,809,868 A | 3/1989 | Pomroy | |
| D304,275 S | 10/1989 | Kiefer | |
| 5,105,768 A | 4/1992 | Johnson | |
| 5,161,711 A | 11/1992 | Picozza et al. | |
| 5,209,184 A | 5/1993 | Sharkan et al. | |
| D344,210 S | 2/1994 | Cousins et al. | |
| 5,409,126 A | 4/1995 | DeMars | |
| D376,960 S | 12/1996 | Ferris | |

(Continued)

FOREIGN PATENT DOCUMENTS

| | | |
|---|---|---|
| CA | 81297 A | 6/1903 |
| CA | 87811 S | 10/1999 |

(Continued)

OTHER PUBLICATIONS

Dec. 2, 2019—(PCT) Written Opinion and ISR App. PCT/US2019/053252.

(Continued)

*Primary Examiner* — Elizabeth J Volz
(74) *Attorney, Agent, or Firm* — Banner & Witcoff, Ltd.

(57) ABSTRACT

A bowl may be configured to include an outer body that has a u-shaped cross section, and the outer body may have a bottom configured to support the bowl on a surface, the bottom also including a circular groove around a circumference of the bottom and a bracket within the circular groove, wherein a foot is inserted within the groove, and wherein the foot is secured to the circular groove by the bracket. The bowl may include an inner body, wherein the inner body is concave and dome-shaped. The inner body may hold a liquid or solid, and the inner body is connected to an upper edge of the outer body. An internal cavity is formed by the outer body and inner body, and the internal cavity is insulative. The connection formed by the upper edge of the outer body and the inner body may be seamless.

20 Claims, 7 Drawing Sheets

(56) References Cited

U.S. PATENT DOCUMENTS

| | | |
|---|---|---|
| 5,752,464 A | 5/1998 | King et al. |
| D412,226 S | 7/1999 | Bellehumeur |
| D426,427 S | 6/2000 | Rubbright et al. |
| D476,852 S | 7/2003 | Willis |
| D476,861 S | 7/2003 | Zettle et al. |
| D479,806 S | 9/2003 | Nilsson |
| D483,229 S | 12/2003 | Maier-Aichen |
| D498,389 S | 11/2004 | Tollman |
| 6,923,017 B2 | 8/2005 | Dais et al. |
| 7,040,249 B1 | 5/2006 | Mushen |
| 7,063,231 B2 | 6/2006 | Stanos et al. |
| D545,627 S | 7/2007 | Chatterton et al. |
| D549,050 S | 8/2007 | Spencer et al. |
| D563,607 S | 3/2008 | Northrop |
| D564,710 S | 3/2008 | Modi et al. |
| D564,711 S | 3/2008 | Modi et al. |
| D565,253 S | 3/2008 | Modi et al. |
| 7,380,412 B2 | 6/2008 | Roth et al. |
| 7,387,082 B1 | 6/2008 | Fried |
| 7,392,761 B2 | 7/2008 | Kujawa et al. |
| D584,110 S | 1/2009 | Hauser |
| D601,309 S | 9/2009 | Babal |
| 7,600,486 B2 | 10/2009 | Ellis |
| D636,946 S | 4/2011 | Able |
| 7,922,027 B2 * | 4/2011 | Boyden .................. A47J 36/24 220/573.2 |
| D684,017 S | 6/2013 | Wong |
| D687,678 S | 8/2013 | Del Solar et al. |
| D689,334 S | 9/2013 | Krueger et al. |
| D693,182 S | 11/2013 | Katterheinrich et al. |
| 8,646,413 B2 | 2/2014 | Padia |
| 8,919,590 B2 * | 12/2014 | Gillette .............. B65D 21/0204 220/23.87 |
| D722,252 S | 2/2015 | Lee et al. |
| D749,371 S | 2/2016 | Kolano |
| D761,061 S | 7/2016 | McConnell et al. |
| 9,402,371 B2 | 8/2016 | Rabideau |
| D793,170 S | 8/2017 | Karussi et al. |
| D794,393 S | 8/2017 | Karussi et al. |
| D794,394 S | 8/2017 | Karussi |
| 9,832,971 B1 | 12/2017 | Hollander et al. |
| 9,883,759 B2 | 2/2018 | Kelaher et al. |
| D816,285 S | 4/2018 | Seiders et al. |
| D824,720 S | 8/2018 | Gagnon et al. |
| D827,382 S | 9/2018 | Uzunlar |
| D842,047 S | 3/2019 | Jordan |
| D869,241 S | 12/2019 | Ellison et al. |
| 2006/0144340 A1 | 7/2006 | Burge et al. |
| 2007/0034161 A1 | 2/2007 | Thompson |
| 2008/0022937 A1 | 1/2008 | Shirley et al. |
| 2008/0302307 A1 | 12/2008 | Bertsch et al. |
| 2008/0308044 A1 | 12/2008 | Tiemann |
| 2009/0026205 A1 | 1/2009 | Moon |
| 2010/0018970 A1 * | 1/2010 | Jain ...................... A01K 5/0114 220/62.11 |
| 2010/0263328 A1 | 10/2010 | Dorsey et al. |
| 2011/0162583 A1 | 7/2011 | Rostamo et al. |
| 2011/0180543 A1 | 7/2011 | Rusnak et al. |
| 2014/0326189 A1 | 11/2014 | Jain |
| 2016/0262345 A1 | 9/2016 | Gitter et al. |
| 2016/0376065 A1 * | 12/2016 | Zimmerman .......... A47G 19/10 220/574 |
| 2018/0134465 A1 | 5/2018 | Kuo |
| 2018/0222660 A1 | 8/2018 | Krus |
| 2018/0289186 A1 | 10/2018 | Heiberger |
| 2019/0059321 A1 | 2/2019 | Casale |
| 2019/0315538 A1 | 10/2019 | Cheng |

FOREIGN PATENT DOCUMENTS

| | | |
|---|---|---|
| CA | 142678 S | 5/2013 |
| CN | 1792735 A | 6/2006 |
| CN | 301376984 | 11/2010 |
| CN | 301447169 | 1/2011 |
| CN | 201995435 U | 10/2011 |
| CN | 302323891 | 2/2013 |
| CN | 302859335 | 6/2014 |
| CN | 303304588 | 7/2015 |
| CN | 303488464 | 12/2015 |
| CN | 303694772 | 6/2016 |
| CN | 303927758 | 11/2016 |
| CN | 303953741 | 11/2016 |
| CN | 303990818 | 12/2016 |
| CN | 304164337 | 6/2017 |
| CN | 304238791 | 8/2017 |
| CN | 304255933 | 8/2017 |
| CN | 304373499 | 11/2017 |
| CN | 304448019 | 1/2018 |
| CN | 304480651 | 1/2018 |
| CN | 304490101 | 2/2018 |
| CN | 107985786 A | 5/2018 |
| CN | 208610686 U | 3/2019 |
| CN | 305101859 | 4/2019 |
| CN | 110371482 A | 10/2019 |
| CN | 305549362 | 1/2020 |
| DE | 20313085 U1 | 11/2003 |
| EP | 001606385-0030 | 11/1919 |
| EP | 000146816-0002 | 6/2004 |
| EP | 000236880-0001 | 12/2004 |
| EP | 000467519-0002 | 2/2006 |
| EP | 000555289-0001 | 8/2006 |
| EP | 001606385-0031 | 11/2009 |
| EP | 2147593 A2 | 1/2010 |
| EP | 002547281-0001 | 10/2014 |
| EP | 2720960 B1 | 9/2015 |
| EP | 003860097-0001 | 5/2017 |
| EP | 3046411 B1 | 4/2019 |
| GB | 2094194 | 8/2000 |
| IN | 265797-0001 | 5/2015 |
| IN | 201711037261 | 6/2019 |
| IN | 314224-004-0001 | 1/2020 |
| JP | 5132299 B2 | 1/2013 |
| JP | D1622556 | 1/2019 |
| KR | 19980028254 U | 8/1998 |
| KR | 200351500 Y1 | 5/2004 |
| KR | 20060116628 A | 11/2006 |
| KR | 101180553 B1 | 9/2012 |
| KR | 300826611.0000 | 11/2015 |
| WO | D060038-001 | 6/2002 |
| WO | 06070965 A1 | 7/2006 |
| WO | 12053734 A1 | 4/2012 |
| WO | 2017160848 A1 | 9/2017 |
| WO | 2019120407 A1 | 6/2019 |

OTHER PUBLICATIONS

Dec. 2, 2019—(PCT) Written Opinion and IPR—App PCT/US2019/053252.

* cited by examiner

BOWL AND METHOD OF FORMING A BOWL

FIELD

The present disclosure herein relates broadly to bowls, and more specifically, to dog bowls used for feeding food and water to animals such as dogs.

BACKGROUND

A bowl may be configured to store a volume of liquid or a mass of food. Dog or animal bowls can be filled with hot or cold potable/drinkable liquids, such as water, and various types of pet food to include hard or soft food, or wet or dry pet food, as well as various types of food normally fit for human consumption, e.g., raw or cooked fruits or vegetables, raw or cooked meat and poultry, or fish, etc.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In certain examples, a bowl can be configured to retain a volume of liquid or a mass of food. The bowl can include an outer body, wherein the outer body has a u-shaped cross section. The outer body also has a bottom configured to support the bowl on a surface. The bottom may also include a circular groove around a circumference of the bottom and a bracket within the circular groove. A no-slip foot can be inserted within the groove, and the foot may be secured to the circular groove by the bracket. The bowl may also include an inner body, wherein the inner body is concave and dome-shaped. The inner body may be configured to hold a liquid or solid, and the inner body may be connected to an upper edge of the outer body. An internal cavity is formed by the outer body and inner body, and the internal cavity may be insulative.

In other examples, a bowl may include an outer body that has a u-shaped cross section, and the outer body may include a bottom configured to support the bowl on a surface. The bottom may include a circular groove, wherein the circular groove runs along a circumference of the bottom, a bracket within the circular groove, and a rubber foot, wherein the foot is inserted within the groove. The foot may be secured to the circular groove by the bracket. The bracket may be welded to the bottom of the bowl. The bowl may also include an inner body that is concave and dome-shaped, and the inner body may be configured to hold a liquid or solid. The inner body may also include a lip, wherein the inner body lip is welded to an upper edge of the outer body. The resulting connection formed between the upper edge of the outer body and the inner body lip may be seamless, i.e., not visible. The bowl may also include an internal cavity formed by the outer body and the inner body, and the internal cavity may be insulative. In other examples, the ratio of the diameter of the bowl to the height of the bowl is about 2.22 to 1. In yet other examples, the outer body is made of stainless steel and the inner body is made of stainless steel.

In another example, a method of forming a bowl is disclosed by forming an outer body of a bowl, wherein the outer body has a u-shaped cross section, and the outer body includes a bottom configured to support the bowl on a surface. The bowl may also be formed to include a bottom comprising a circular groove around the circumference of the bottom of the outer body, and may also include a bracket within the circular groove. A rubber or polymer foot may be inserted within the groove, and the foot may be secured to the circular groove by the bracket. The method of forming a bowl may also include forming an inner body of the bowl, wherein the inner body is concave and dome-shaped. The inner body may be configured to hold a liquid or solid. The inner body may also be connected to an upper edge of the outer body to form an internal cavity that is insulative. The bowl may be formed to have a ratio of the diameter of the bowl to the height of the bowl that is about 2.22 to 1. The outer body may be formed of stainless steel and the inner body may be formed of stainless steel.

BRIEF DESCRIPTION OF THE DRAWINGS

The present disclosure is illustrated by way of example and not limited in the accompanying figures in which like reference numerals indicate similar elements and in which.

Further, it is to be understood that the drawings may represent the scale of different components of various examples; however, the disclosed examples are not limited to that particular scale.

DETAILED DESCRIPTION

In the following description of the various examples, reference is made to the accompanying drawings, which form a part hereof, and in which is shown by way of illustration various examples in which aspects of the disclosure may be practiced. It is to be understood that other examples may be utilized and structural and functional modifications may be made without departing from the scope and spirit of the present disclosure.

Figure 1:
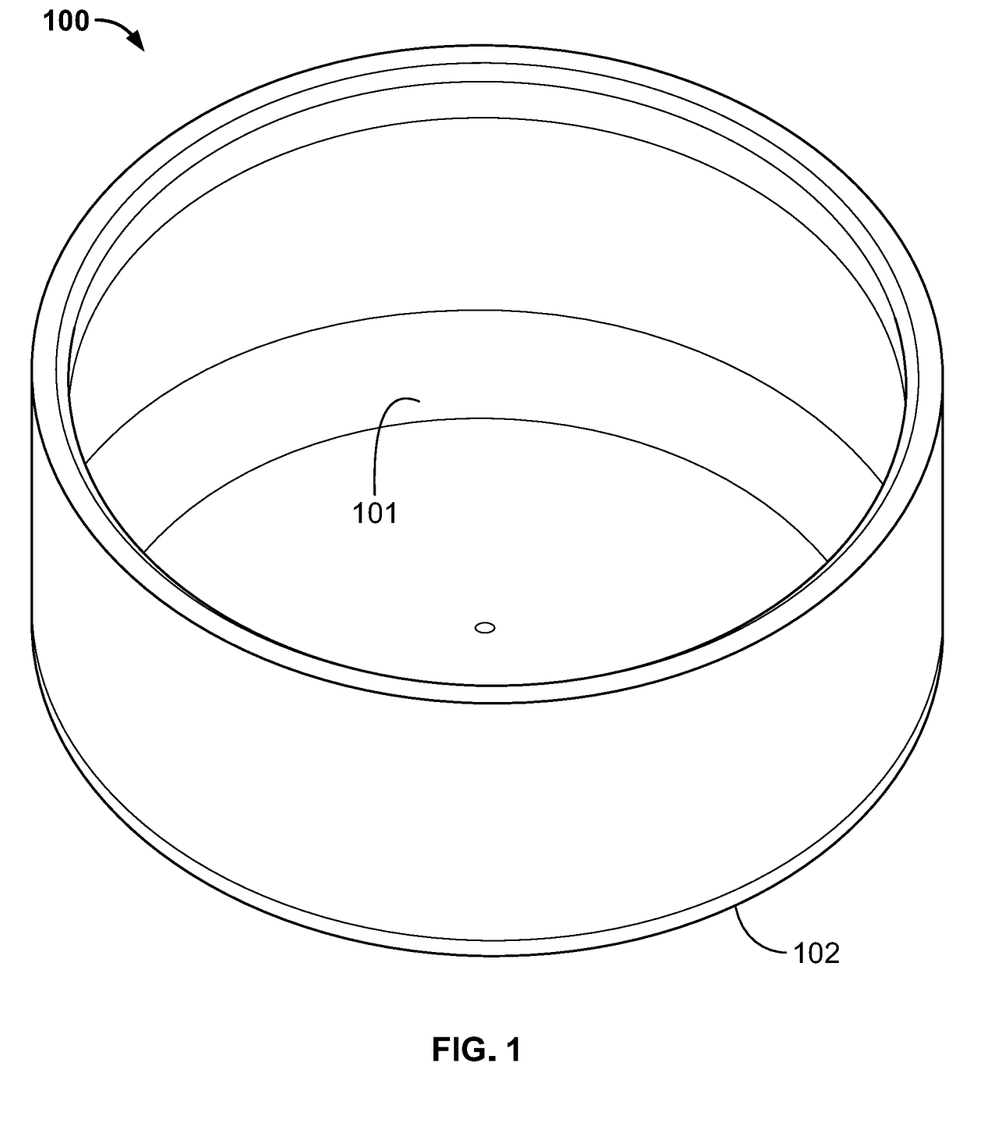
FIG. 1 depicts an isometric view of an example bowl, according to one or more aspects described herein.

Aspects of this disclosure relate to a bowl or dog bowl configured to store a mass of food or a volume of liquid. FIG. 1 depicts an isometric view of a bowl 100. In one example, the bowl 100 may be configured to store a volume of liquid. In another example, the bowl 100 is configured to store a mass of food. The bowl 100 generally includes a concave reservoir 101 on top for storing or containing a solid or liquid. The bowl 100 generally includes a relatively flat bottom 102. The bowl 100 can be formed, wholly or in part, of a single or double-wall. The bowl 100 may also be of vacuumed formed construction to provide insulative properties to help maintain the temperature of the food or liquid within the bowl. The bowl 101 may also be formed wholly or in part by other methods that also provide insulative properties.

Figure 2:
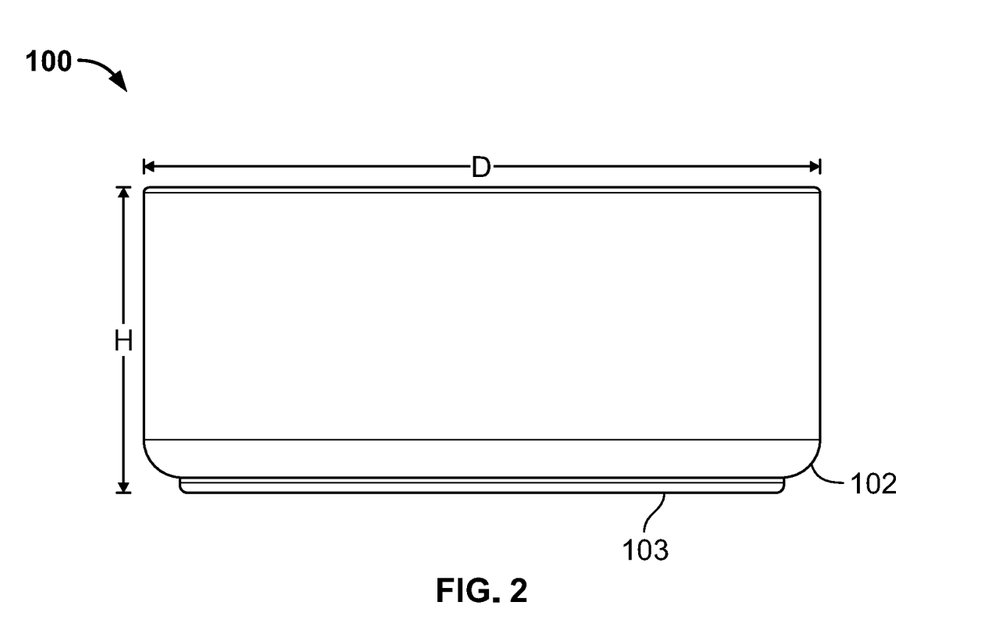
FIG. 2 depicts a side view of the bowl of FIG. 1, according to one or more aspects described herein.

As shown in FIG. 2, the bowl 100 includes a bottom 102 with a foot 103 that runs around the circumference of the bottom 102. The no-slip foot 102 may be a rubber or other polymer and provides an increased frictional surface that prevents the bowl 100 from moving, such as when a dog or other animal is eating food or drinking water. In one aspect, the footing may also be a material that provides enough buoyancy to prevent the bowl 100 from sinking in water, i.e., the bowl can float. In another aspect, the bowl 100 includes both a diameter, annotated with a "D" in FIG. 2, and a height, annotated with an "H" in FIG. 2. The bowl 100 may be sized according to a ratio of the height to the diameter. In one example, the ratio between the height and the diameter may be 2.22 to 1 for a height of about 3.6 inches and a diameter of about 8 inches. In other aspects, the ratio of the height to the diameter may be 2.00-3.00 to 1. In yet other aspects, the ratio of the height to the diameter may be 2.15, 2.16, 2.17, 2.18, 2.19, 2.20, 2.21, 2.22, 2.25, 2.26, 2.27, 2.28, 2.29, 2.30, 2.31, 2.32, 2.33, 2.34, 2.35, 2.36, 2.38, 2.39, 2.40, 2.41, 2.42, 2.43, 2.44, 2.45, 2.46, 2.47, 2.48, 2.49, or 2.50 to 1. In one example, the bowl 101 has a height of at least 3.5 inches and a diameter of at least 8.0 inches. The bottom portion 102 may also include a recessed logo. The logo may be stamped or etched into the bottom portion 102.

Figure 3:
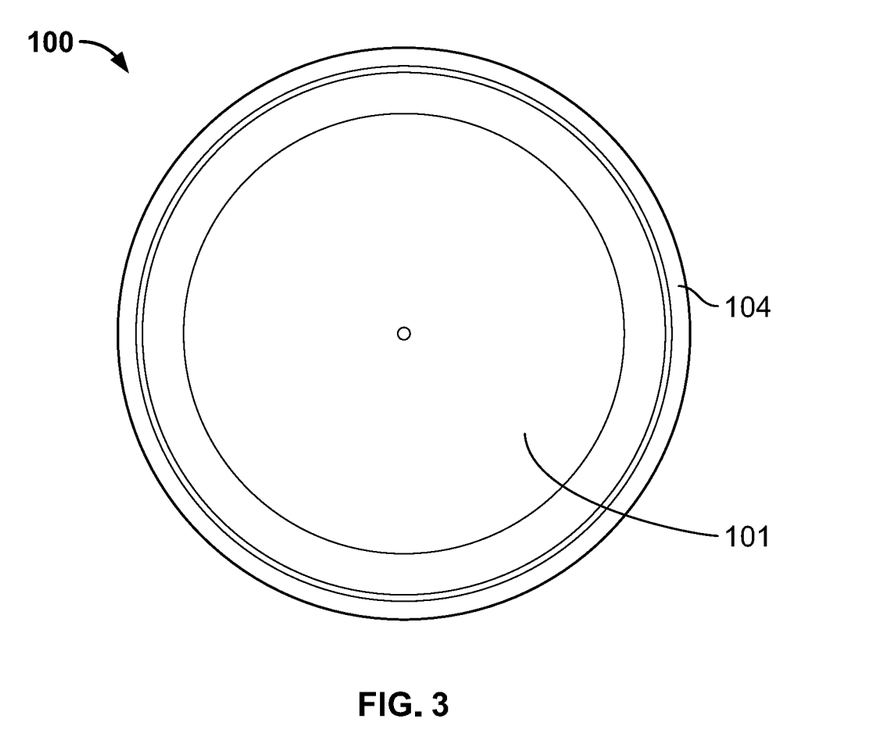
FIG. 3 depicts a top view of the bowl of FIG. 1, according to one or more aspects described herein.
Figure 4:
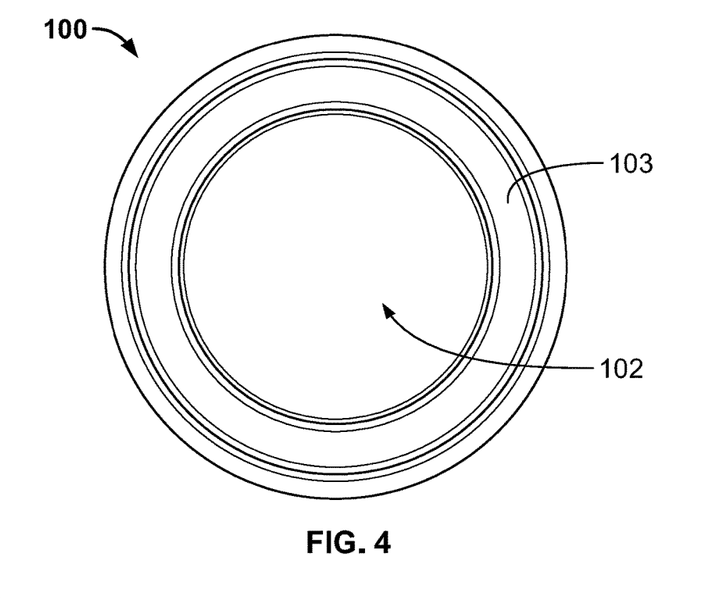
FIG. 4 depicts a bottom view of the bowl of FIG. 1, according to one or more aspects described herein.

FIGS. 3 and 4 show top and bottom views of the bowl 100, respectively. The bowl includes an upper rim 104 and the reservoir 101. The reservoir 101 is generally concave or dome-shaped. However, other suitable shapes are contemplated for the reservoir such as a cone, or frustoconical shape. In other examples, the reservoir 101 may be a shape to slow down the feeding of a dog. In still other examples, the reservoir may accommodate devices to slow the feeding of a dog. In some examples, the internal reservoir 101 has a capacity to hold at least 8 standard cups of food or water. In other examples, the bowl 100 and internal reservoir 101 can be configured to hold at least 1, 2, 3, 4, 5, 6, or 7 standard cups of food or water. As shown in FIG. 4, the foot 103 is positioned in a circular groove that runs around the circumference of the bottom 102 of the bowl. The foot 103 may be position within the groove so that the foot 103 is flush with the bottom 102 of the bowl. In another example, the foot 103 protrudes or extends beyond the bottom 102 of the bowl. In other words, the foot 103 is not flush with the bottom 102 of the bowl. In still other examples, the foot has a width of at least 0.25, 0.50, 0.75, 0.80, 0.85, 0.90, 0.95, 1.00, or 1.25 inches. In yet other examples, the foot has a thickness of at least 0.05, 0.10, 0.15, 0.20, 0.25, 0.30, 0.35, 0.40, 0.45, or 0.50 inches. In certain examples, the foot has an outer diameter of at least 5.0, 5.5, 6.0, 6.5, 7.0, 7.5, 8.0, 8.5, 9.0, 9.5, or 10.0 inches. In still other examples, the foot has an inner diameter of at least 3.0, 3.5, 4.0, 4.5, 5.0, 5.5, 6.0, 6.5, 7.0, 7.5, 8.0, 8.5, 9.0, 9.5, or 10.0 inches. In certain examples, the foot 103 is a high durometer rubber. In some examples the foot 103 is removable. As discussed in further detail below, in other examples the foot 103 is permanently affixed to the bottom 102 of the bowl.

Figure 5:
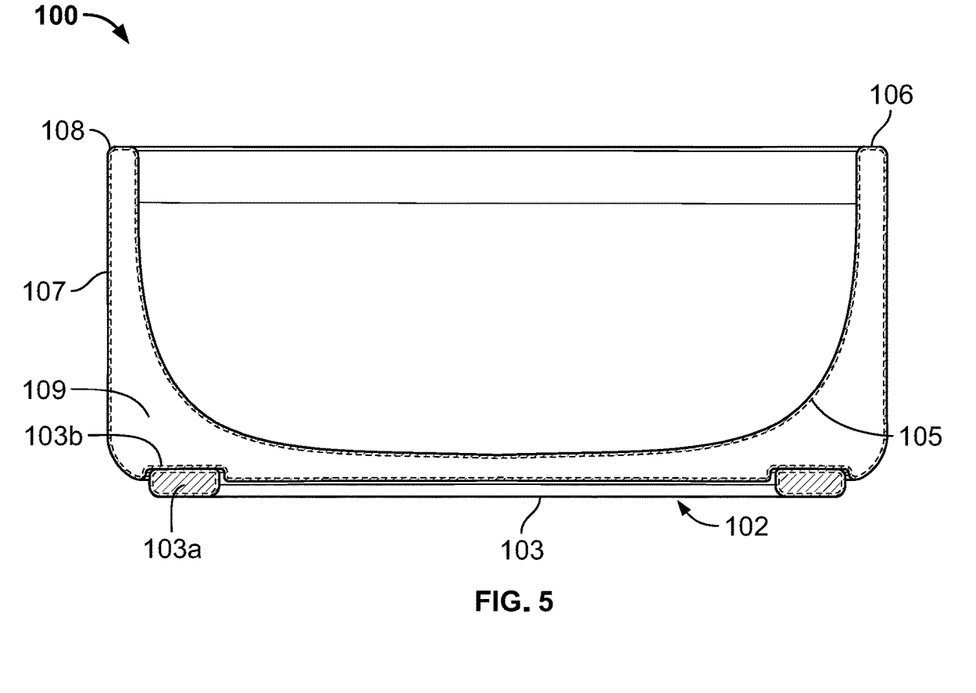
FIG. 5 depicts a cross-sectional view of the bowl of FIG. 2, according to one or more aspects described herein.

As shown in FIG. 5, a cross-sectional view of the bowl 100 is depicted. The foot 103 is depicted along with a cross-sectional view of the foot 103a. Outer body 107 of the bowl is depicted. In one example, as shown in FIG. 5, outer body 5 may include a U-shaped cross section and the bottom 102 is configured to support the bowl on a surface. In another example, a foot 103 is recessed in groove 103b that runs around the circumference of the bottom 102. In some examples, the groove 103b includes a width and a thickness corresponding to the width of the foot 103 as previously described. In other examples, the groove 103b includes a width to accommodate the width of the foot 103 and a thickness to either allow the entire foot 103 to recess into the groove 103b so that is flush with the bottom of the bowl 102, or the groove 103b includes a thickness less than the thickness of the foot 103 to allow the foot to protrude from the bottom of the bowl 102. FIG. 5 also depicts inner body 105. In one example, inner body 105 is also U-shaped. In another example, inner body 105 is concave and/or dome-shaped and configured to hold a liquid or a solid.

Figure 6:
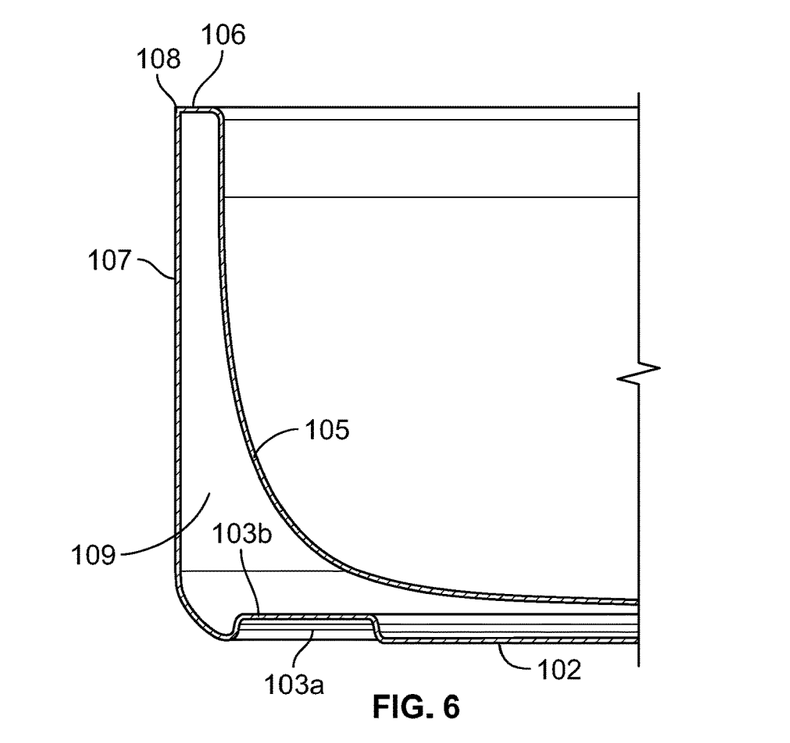
FIG. 6 depicts a partial and enlarged cross-sectional view of the bowl of FIG. 2, according to one or more aspects described herein.
Figure 7:
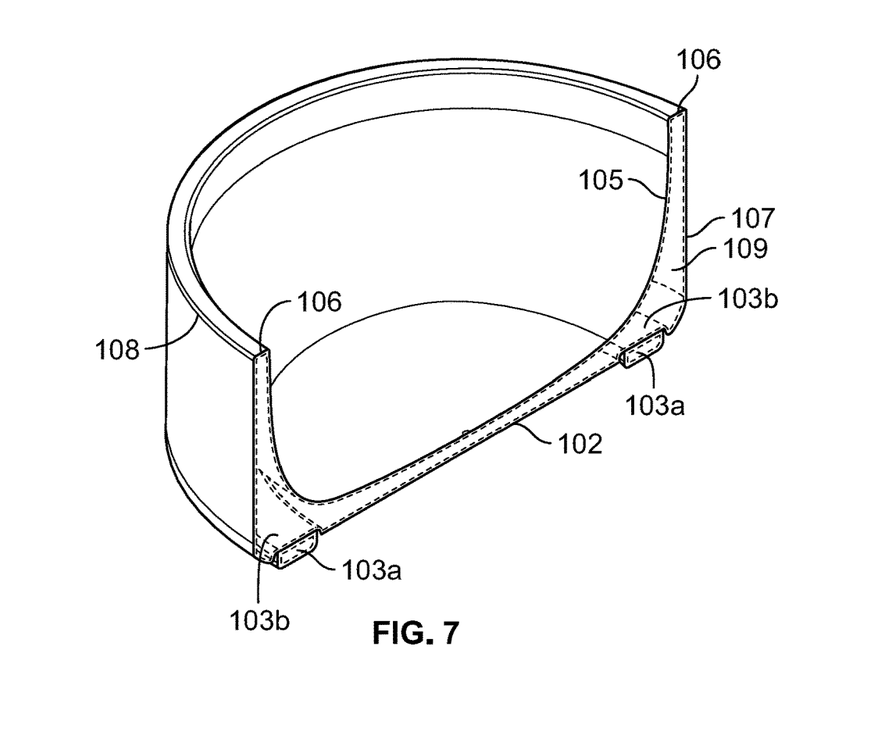
FIG. 7 depicts a cross-sectional view of the bowl of FIG. 1, according to one or more aspects described herein.

In another example, as shown in FIG. 5, inner body 105 includes a lip 106 extending or curving away from the concave bowl reservoir 101. In another example, the lip 106 is perpendicular to a side of the inner body that is perpendicular to a side of the outer body that is perpendicular to a surface the bowl is placed upon. As shown in FIGS. 5-7, the bowl 100 is formed by connecting the inner body 105 with the outer body 107. In some examples the shape of the bowl allows the stacking of the bowls for ease of storage and transport. In certain examples, an internal cavity 109 is formed by the inner body 105 and the outer body 107. In another example, the internal cavity 109 is naturally insulative as it is a barrier between the outer body 107 that is exposed to the elements, and inner body 105 that includes the reservoir 101 and thus the food or water of bowl 100. In other words, the internal cavity 109 prevents the radiative heat transfer from outer body 107 to the reservoir 101. In one example, the inner body 105 is placed inside the outer body 107. The lip 106 of the inner body 105 forms a seam 108 with the top edge of the outer body 107. The seam 108 may be welded to connect the inner body to the outer body. Welding may include any suitable welding method, such as a laser welding, brazing process, TIG (gas tungsten arc) welding, MIG (metal inert gas) welding, arc welding, or a silver soldering. In other examples, an adhesive is used to connect the inner body to the outer body. In other examples, the outer body is stainless steel, aluminum, an aluminum alloy, titanium, a titanium alloy, or a polymer. In still other examples, the inner body may be stainless steel, aluminum, an aluminum alloy, titanium, a titanium alloy, or a polymer. In other examples, the inner body and outer body may be ceramic, carbon fiber, or plastic. Other suitable materials, however, are contemplated as discussed herein. The weld or seam 108 may be seamless. For example, the weld or seam 108 can be polished by mechanical abrasion (grinding wheel, polishing wheel, etc.), chemical polishing, or electro-chemical polishing. In this way, the connection formed by inner body 105 and outer body 107, i.e., seam 108, is not visually apparent to the end user. In certain instances, a laser welding process can help to provide a less noticeable welding line or seam 108 to provide a cleaner look on the final product. Specifically, the weld line is smaller and less polishing is required to hide the weld line or seam 108 to the user. In still other examples inner body 105 may be fastened to outer body 107 by any means suitable, including for example, using chemical bonding agents including adhesives, using mechanical fasteners including screws, rivets or interference fittings, and/or using thermal bonding (e.g., by melting) with or without a separate bonding agent such as a low melting point polymer.

In another example, a resin can seal the inner body 105 (and/or the lip 106) with the outer body 107, and/or to create a vacuum in the internal cavity 109. Again, after the inner body 105 or lip 106 is secured to the outer body 107, the connection or seam 108 can be polished such that the connection, weld, or seam 108 is not readily apparent or noticeable to the user.

Like in the above example, the outer body 107 or the inner body 105 can include a divot or dimple structure (not depicted) that is used during a vacuum formation process discussed herein. In one example, the divot or dimple can resemble a dome shape. However, other suitable shapes are contemplated for receiving the resin material during the manufacturing process. In accordance with other examples, a bowl may be configured with one or more vacuum chambers, such as internal cavity 109 shown in FIGS. 5-7, to reduce heat transfer by conduction, convection and/or radiation within the bowls 100. To achieve a vacuum between the outer body and inner body of the bowl, the air within the bowl can be removed by heating the bowl within the vacuum and removing the air between the outer body 107 and the inner body 105 through the openings in the divots or dimples (not depicted) on outer body 107 and/or inner body 105. The divot or dimples provide a conduit to the internal cavity of the bowl. Specifically, the bowl 100 can be oriented inverted within a vacuum formation chamber, and a resin, which can be in the shape of a pill, can be placed into the divot or dimple in the bottom of the bowl during the vacuum forming process. In certain examples, the resin can be approximately 3 mm to 5 mm in diameter, and the openings in the divot or dimple can be approximately 1 mm in size. In this way, when the bowl 100 is heated the resin becomes viscous so as to not flow or drip into the internal cavity of the bowl through the opening, but permeable to air such that the air escapes the internal chamber 109 or other internal volume of the bowl. Once the resin cools and solidifies, it covers the openings of the divot or dimple and seals the internal cavity 109 or other internal volumes of the bowl 100 to form the vacuum within the bowl 100. Any suitable resins are contemplated. In certain examples, the resin material can be synthetic, such as an epoxy resin or may be plant based. In yet other examples, after vacuumization, the dimple or divot can be polished such that the dimple or divot is not readily apparent or noticeable to the user. In still other examples, the dimple or divot may be covered by a cap and polished, in the same manner as described above, such that the cap and dimple or divot are not readily apparent or noticeable to the user.

In addition, various other techniques can be used to cover or seal the dimple, which may include painting the resin, powder coating the dimple, adhering metal or paper over the opening, or adding a rubber or plastic piece to cover the opening, or including a rubber or plastic piece on the bottom. In still other examples, the dimples or divots can be covered or sealed with either a disc or with an end cap (not shown). Welding the disc to the bottom of the bowl 100 or welding an end cap to the bottom of the outer body 107 provides a more permanent structure that can be repeatedly used and washed without compromising the structural integrity of the bowl 100. Covering the divots with the disc may result in a more compact bowl since the end cap will add to the overall height of the bowl. This may help in saving costs in manufacturing the bowl, since less material is needed. Additionally, the bowl will be able to store more liquid within a smaller bowl volume and length. Alternatively, the bowl 100 may be configured with a dimple or divot in the inner body 105 (not shown) to facilitate the vacuumization process as described herein.

Additional alternate methods of insulating the bowl 100 are also contemplated. For example, the internal cavity 109 may be filled with various insulating materials that exhibit low thermal conductivity such as foam. As such, the internal cavity 109 may, in certain examples, be filled with air to form air pockets for insulation, or filled with a mass of material such as a polymer material, or a polymer foam material. In one specific example, the internal cavity 109 may be filled with polystyrene. However, additional or alternative insulating materials may be utilized to fill the internal cavity 109 without departing from the scope of these disclosures. In certain examples, the internal cavity 109 is filled with insulating materials by injecting the materials via dimples, divots, or other conduits to the internal cavity 109. In other examples, the insulating materials are added to the internal cavity 109 prior to connecting the inner body 105 with the outer body 107. In other examples, the internal cavity 109 may be configured to be partially or wholly filled with an additional insulating material. For example, internal cavity 109 may be configured to be, or may be, at least partially filled with an alternative polymeric foam, such as polystyrene foam, polyvinyl chloride foam, or polyimide foam, among many others.

In another example, a polymer or polymer blend adheres to the interior surface of the inner body 105 and insulates inner body 105, may have a first thermal resistivity, and an insulating material that adheres to the interior of the outer body 107 and insulates outer body 107, may have a second thermal resistivity, that is higher than the polymer or polymer blend of the inner body 105 insulation and first thermal sensitivity. In another example, the first and second thermal sensitivities are the same. In still another example, the first thermal sensitivity is higher than the second thermal sensitivity. In yet another implementation, one or more hollow portions 351 and/or one or more cavities 214 may be configured to be, or may be, at least partially filled with a second insulating material that adheres to one or more molded polymeric surfaces of the hollow portion(s) and/or the cavity(ies). The second insulating material may also adhere the insulating material to these molded polymeric surfaces or may adhere the insulating material to itself (i.e., act as a binder for the insulating material). For example, a mix of polymer flakes, or pellets, in addition to a second insulating material that is namely a binder may be injected into one or more hollow portions 351, one or more cavities 214, or any combination thereof.

In still other examples, the internal cavity 109 may be partially filled with an insulating material as described above, such as an insulating foam (polyurethane foam). Partially filling the internal cavity 109 may refer to injecting, or otherwise providing, insulating foam such that the inner cavity 109 may be at least about 50% filled, at least about 80% filled, at least about 85% filled, at least about 90% filled, at least about 95% filled, at least about 97% filled, at least about 99% filled, at least about 99.7% filled, or at least about 99.9% filled, with the percentage filled meaning the total volume, in bulk form, of the insulating material and any second insulating material, divided by the volume of the internal cavity 109.

Figure 8:
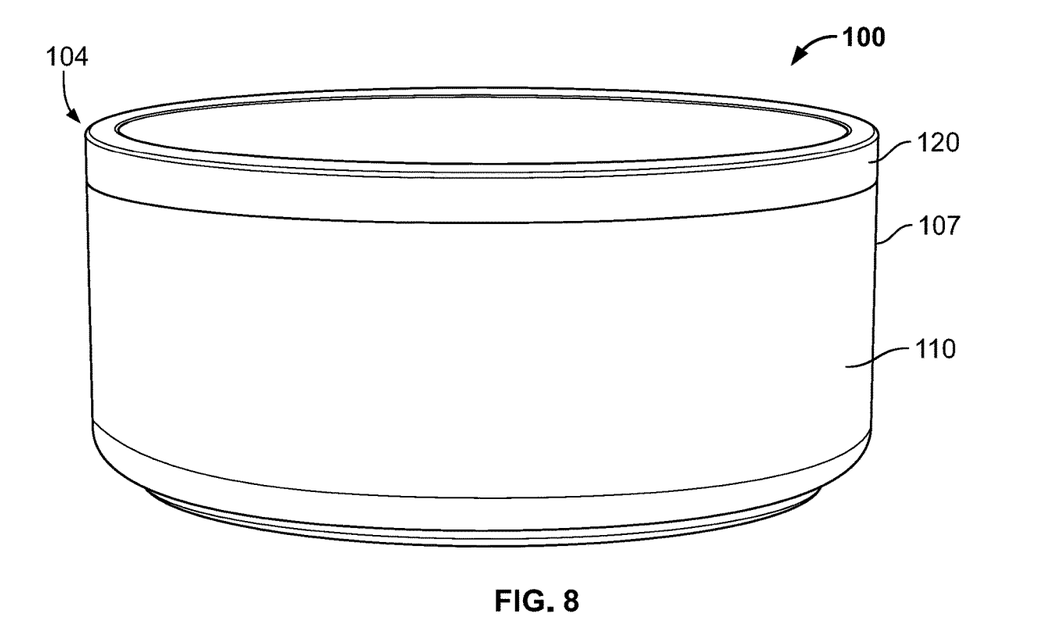
FIG. 8 depicts an isometric view of another example bowl, according to one or more aspects described herein.
Figure 9:
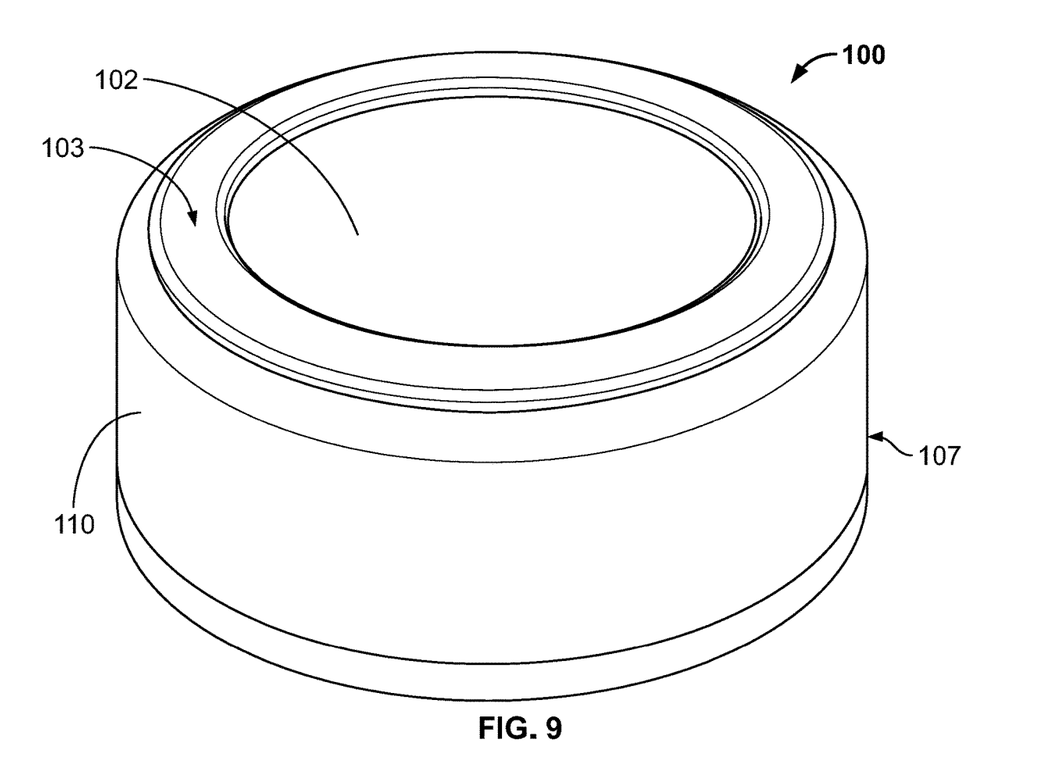
FIG. 9 depicts an isometric bottom view of the bowl of FIG. 8, according to one or more aspects described herein.

As shown in FIGS. 8-9, exemplary bowl 100 may include an outer body 107 or inner body 105 configured to dampen the amount of sound that occurs when the bowl 100 is placed onto a surface. In one example, a weight component, for example rubber, plastic, metal or other material 110 can be included on a portion of the outer body 107 or a portion of the inner body 105, such as on the upper rim 104. In other examples, the entire outer body 107 may include a material 110 for damping sound when the bowl 100 is placed on a surface. In still other examples, rubber, plastic, metal or other materials can be included within the internal cavity 109 for damping sound when the bowl 100 is placed on a surface. In other examples, the foot 103 may also be made of and/or include additional material or components for damping sound when the bowl 100 is placed on a surface.

Moreover, the material or component 110 can be adhered, removably fastened, or welded to the outer body 107, the inner body 105, or inside the internal cavity 109 to assist in damping the sound when the bowl 100 is placed onto a surface. In the case of including a weight or sound damping material in the internal cavity 109, the weight component or material can be configured to withstand the heat of the vacuumization chamber, which in certain instances can be greater than 500° C. However, the weight component or material placed on the exterior of the outer body 107 or the exterior of inner body 105 for damping purposes does not have to be configured to withstand the heat of the vacuumization chamber, since the material can be added after the vacuum is formed. In other examples, the material 110 is a liquid paint or a powder coating. In certain examples, the material 110 is an HAA polyester type powder coating. The powder coating may be a thermoplastic or a thermoset polymer. In another example, as shown in FIG. 8, the bowl 100 may further include a band 120 at the top of the outer body 107. In other examples, the band 120 is stainless steel and is above the material 110, e.g., a powder coating or paint. In another example, the band is at least 12 mm in height. In other examples, the band 120 is about 10 mm to about 15 mm in height. In still other examples, the material 110 is a coating with a thickness of about 0.0025 to about 0.0035 inches. In other examples, the material 110 is a coating with a thickness of about 0.0010 to about 0.0050 inches.

Other sound damping techniques are contemplated. For example, the inner body 105 or outer body 107 can be provided with a ripple shape or can be provided with various undulations in order to provide damping when the bowl 100 is placed onto a surface. In yet another example, multiple depressions or divots could be provided on the outer body 107 and each depression or divot can be filled with resin to provide for additional sound damping when the bowl 100 is placed onto a solid surface.

Figure 10:
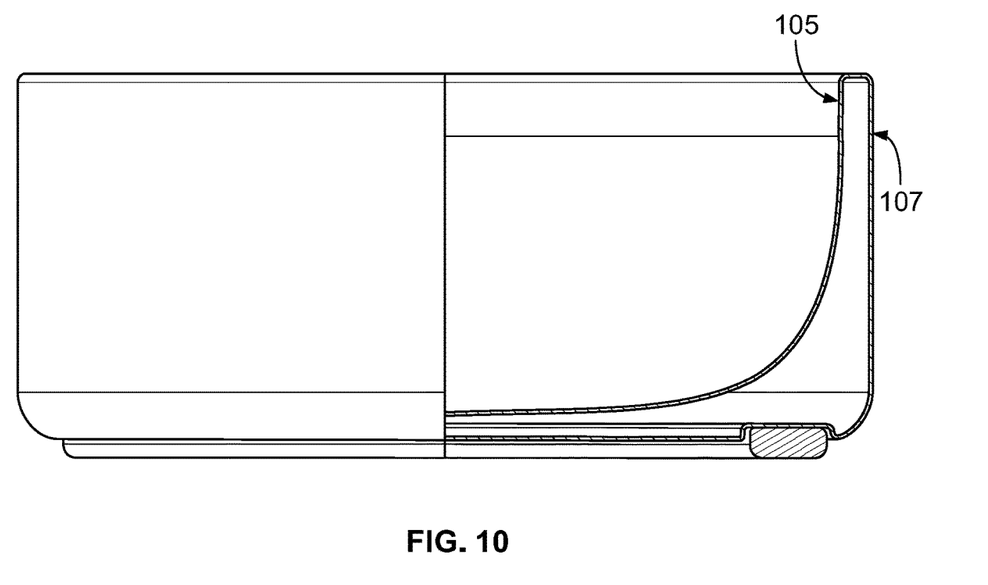
FIG. 10 depicts a side and partial cross-sectional view of the bowl of FIG. 8, according to one or more aspects described herein.

In another example, as shown in the side and partial cross-sectional view of FIG. 10, the bowl inner body 105 has a thickness or "wall" thickness that is less than the thickness or "wall" thickness of the outer body 107. The thickness of outer body 107 can be greater than the thickness of the inner body 105 to assist in damping the sound when the bowl 100 is placed onto a surface. In other examples, the inner body 105 has a thickness that is greater than the thickness of the outer body 107. In still other examples, inner body 105 has a thickness that is equal to the thickness of the outer body 107. In certain examples, the wall thickness of the inner body 105 and/or the outer body 107 can be approximately 0.5 mm to 0.75 mm, 0.8 mm to 1.1 mm. In one specific example, the inner body 105 wall thickness can be approximately 0.7 mm, and the outer body 107 wall thickness can be approximately 0.9 mm to 1.1 mm or greater. Therefore, in certain examples, the outer body 107 wall thickness can be twice as thick as the inner body 105 wall thickness. In still other examples, the outer body 107 wall and/or the inner body 105 wall thickness may be 0.5 mm, 0.55 mm, 0.60 mm, 0.65 mm, 0.70 mm, 0.75 mm, 0.80 mm, 0.85 mm, 0.90 mm, 0.95 mm, 1.0 mm, 1.05 mm, 1.10 mm, 1.15 mm, 1.20 mm, 1.25 mm, 1.30 mm, 1.35 mm, 1.40 mm, 1.45 mm, or 1.50 mm.

Moreover, a thickness of the inner and outer bodies 107 and 105 may be embodied with any dimensional value, without departing from the scope of these disclosures. Also, a surface of one or more of the inner and outer bodies 107 and 105 of the bowl 100 may comprise a ceramic surface, a silvered surface, copper plated, or covered with thin aluminum foil configured to reduce heat transfer by radiation. It is also contemplated that the bowl 100 can include a lid (not shown) to prevent spillage of food or water, or an insulated lid for preventing heat transfer to or from liquids or solids stored within the bowl 100. Such lids can also be insulated using the techniques described herein. Further, the lids may be formed from rubber, plastic, or other polymer, stainless steel, or other metal, or combinations thereof.

In certain examples, the bowl 100 may be constructed from one or more metals, alloys, polymers, ceramics, or fiber-reinforced materials. Additionally, the bowl 100 may be constructed using one or more hot or cold working processes (e.g. stamping, casting, molding, drilling, grinding, forging, among others). For example, the inner body 105 and the outer body 107 can be individually formed as single sheets of material, milled into the appropriate shape, and welded together at a seam 108. The seam can be polished such that the welded portions are not visible to the user. In one implementation, the bowl 100 may be constructed using a stainless steel. In one specific example, the bowl 100 may be formed substantially of 304 stainless steel. In another implementation, the bowl 100 may be constructed using titanium or a titanium alloy.

Figure 11:
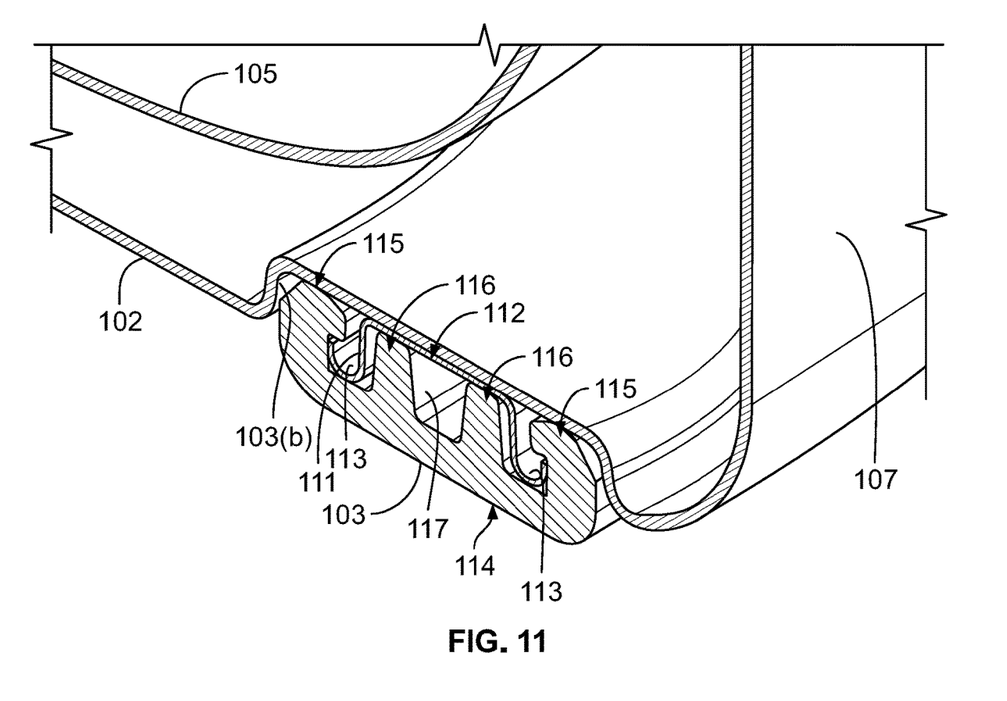
FIG. 11 depicts a partial and enlarged cross-sectional view of the bowl of FIG. 10, according to one or more aspects described herein.

In one example, as shown in the partial and enlarged cross-sectional view of the bowl of FIG. 11, the foot 103 is depressed or recessed into the groove 103b that extends around the circumference of the bottom 102 of the bowl. In another example, the foot 103 is friction fit into the groove 103b. In other examples, the foot 103 is connected to the groove 103b by adhesive. The groove 103b may further include a bracket 111. In one example, the bracket 111 is welded to the top of the groove 103b. This may be accomplished by any suitable welding method, e.g., such as laser welding, brazing processes, arc welding, or silver soldering. In another example, the bracket 111 is connected to the groove 103b by an adhesive or other mechanical device such as a screw or rivet. The foot 103 can be connected or mated to bracket 111.

In one example, as shown in FIG. 11, the foot 103 may be shaped in a manner that is compatible with or mates with the bracket 111. For example, the bottom of the foot 103 may be a flat surface 114. The other side of the foot 103 may include two curved ends 115 and double ridges 116 in the middle of the foot separated by a gap 117. Correspondingly, the bracket 111 may include two curved ends 113 that clamp into or mate with the curved ends 115 of the foot 103. Further, the bracket 111 may include a center gap 112 between the two curved ends 113. Also shown in FIG. 11, the double ridge 116 of the foot 103 is configured to mate with the center gap 112 of the bracket 111. As a result, the foot 103 is secured to the bracket 111 and thus the bottom 102 of the bowl 100.

Figure 12:
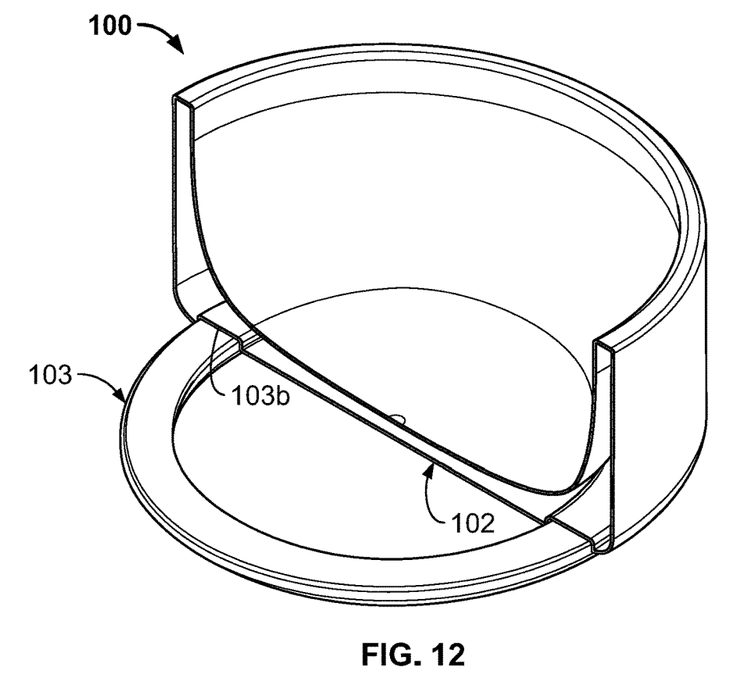
FIG. 12 depicts another example of a partial cross-sectional view of the bowl of FIG. 1, according to one or more aspects described herein.
Figure 13:
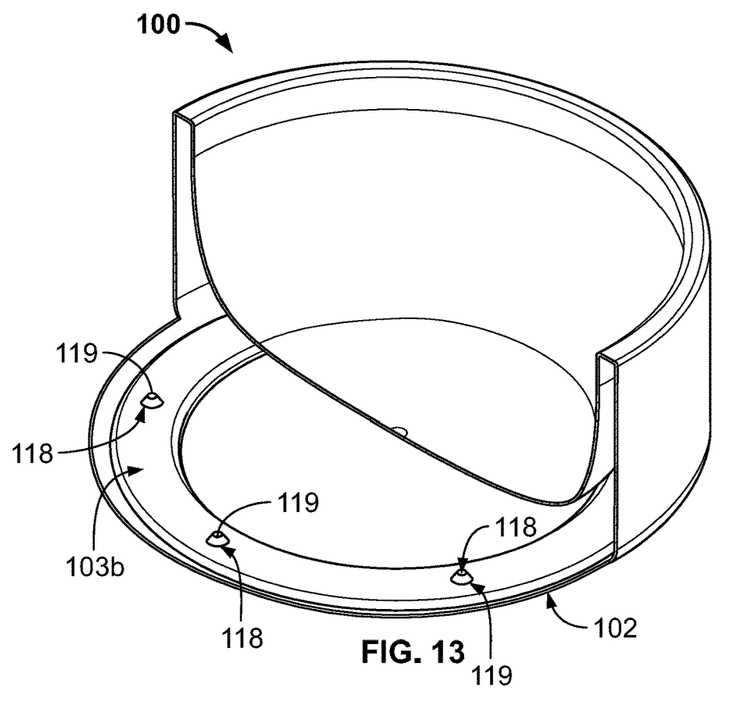
FIG. 13 depicts another example of a partial cross-sectional view of the bowl of FIG. 1, according to one or more aspects described herein.

In certain examples, as shown in FIG. 12, the foot 103 may be constructed as a singular unit that is a continuous ring. In other examples, the foot 103 has a first end and a second end that are not connected. As shown in FIG. 12, the foot 103 may fit tightly inside the groove 103b of the bowl 100. In one example, friction maintains the position of the foot 103 in the groove 103b. In another example, the foot 103 further includes an adhesive to provide additional strength for a connection to groove 103b in addition to the friction fit. In some examples, the flat bottom 114 of the foot 103 is flush with the bottom 102 of the bowl 100. In other examples, the flat bottom 114 of the foot 103 extends past the bottom 102 of the bowl 100, i.e., the foot 103 is only partly recessed in the groove 103b. The partially recessed groove 103 slightly elevates the bowl bottom 102 above a surface and allows an individual to place their fingers under the bottom 102 to easily grasp the bowl 100. Accordingly, the bowl 100 may be easily lifted for transport or movement without spilling the contents. In some examples, as further shown in FIG. 12, the configuration of the foot 103 and the groove 103b provides a sealed bowl 100 without the need for additional hardware to secure the flat faced foot 103 to the groove 103b and bowl 100. In still other examples, as shown in FIG. 13, the groove 103b includes a plurality of bungholes 118 drilled or stamped into the groove 103b at the bottom 102 of the bowl 100. As such, the foot 103 is constructed with a plurality of bungs 119 that mate with the bungholes 118. The foot 103 is secured to the groove 103b when the bungs 119 are snapped into the bungholes 118. This configuration, in some examples, does not require the use of an adhesive or other means to secure the foot 103 to the bowl 100. In other examples, the foot 103 is removable from the groove 103b and is replaceable.

In a specific example, a bowl may include an outer body, wherein the outer body has a u-shaped cross section, the outer body may have a bottom configured to support the bowl on a surface. The bottom may include a circular groove around a circumference of the bottom and a bracket within the circular groove. A foot may be inserted within the groove, and the foot may be secured to the circular groove by the bracket. The bowl may also include an inner body in that is concave and dome-shaped. The inner body may be configured to hold a liquid or solid, and may be connected to an upper edge of the outer body. The bowl may also include an internal cavity formed by the outer body and inner body. The inner cavity may be insulative. The connection formed by the upper edge of the outer body and a lip of the inner body may be seamless. The upper edge of the outer body may be welded to the lip of the inner body. The outer body may be constructed of stainless steel, aluminum, an aluminum alloy, titanium, a titanium alloy, or a polymer, and the inner body may be constructed of stainless steel, aluminum, an aluminum alloy, titanium, a titanium alloy, or a polymer. The bowl outer body or the bowl inner body may also include a sound deadening material. The foot of the bowl may be constructed of a rubber or other polymer. The bowl may be of such a shape that allows the bowl to be stackable with another bowl. The outer body of the bowl may be coated with a powder coating. The internal cavity of the bowl may also include an insulating material. The bowl may have an outer body with a first thickness and an inner body has a second thickness, such that the first thickness is greater than the second thickness. The bowl may include a ratio of a diameter of the bowl to a height of the bowl that is about 2.22 to 1. The bowl may also include a bracket that is welded to the circular groove in the bottom of the bowl.

A method of forming a bowl may include forming an outer body of a bowl that has a u-shaped cross section. The outer body may be formed to have a bottom configured to support the bowl on a surface. A circular groove may be formed in the bottom of the bowl that runs along a circumference of the bottom. A bracket may also be formed within the circular groove in which a rubber foot can be inserted within the groove. The foot may also be secured to the circular groove by the bracket that is welded to the bottom of the bowl. An inner body may be formed that is concave and dome-shaped, and configured to hold a liquid or solid. The inner body may be formed to further include a lip that can be welded to an upper edge formed at the top of the outer body. The connection formed between the upper edge of the outer body and the inner body lip may be formed without a visible seam. An internal cavity may be formed by the outer body and inner body, and the internal cavity may be insulative. The bowl may be formed with a ratio of a diameter of the bowl to a height of the bowl that is about 2.22 to 1. The bowl outer body may be constructed of stainless steel, and the bowl inner body may be constructed of stainless steel. The inner body of the bowl may be formed with a lip at the top of the inner body that can be welded to an upper edge formed at the top of the outer body. The connection between the lip and the upper edge may be seamless. The bowl outer body may be constructed of stainless steel, aluminum, an aluminum alloy, titanium, a titanium alloy, or a polymer, and the bowl inner body may be constructed of stainless steel, aluminum, an aluminum alloy, titanium, a titanium alloy, or a polymer. The bowl may be formed with an outer body that has a first thickness and an inner body that has a second thickness. The outer bowl first thickness may be greater than the inner bowl second thickness. A bowl may be formed with a ratio of a diameter of the bowl to a height of the bowl that is about 2.22 to 1. The foot of the bowl may be constructed of a rubber or other polymer. The bowl may also be formed with the bracket welded to the circular groove in the bottom of the bowl.

The present disclosure is disclosed above and in the accompanying drawings with reference to a variety of examples. The purpose served by the disclosure, however, is to provide examples of the various features and concepts related to the disclosure, not to limit the scope of the disclosure. One skilled in the relevant art will recognize that numerous variations and modifications may be made to the examples described above without departing from the scope of the present disclosure.

What is claimed is:

1. A bowl comprising:

an outer body of a bowl, wherein the outer body has a u-shaped cross section, the outer body having a bottom configured to support the bowl on a surface, the bottom comprising a circular groove around a circumference of the bottom and a bracket within the circular groove, wherein a foot is inserted within the groove, and wherein the foot is secured to the circular groove by the bracket;

an inner body of the bowl, wherein the inner body is concave and dome-shaped, the inner body configured to hold a liquid or solid, wherein the inner body is connected to an upper edge of the outer body, wherein a connection formed by the upper edge of the outer body and a lip of the inner body is seamless, wherein the upper edge of the outer body is welded to the lip of the inner body; and an internal cavity, wherein the internal cavity is formed by the outer body and inner body, and wherein the internal cavity is insulative.

2. The bowl of claim 1, wherein the outer body is stainless steel, aluminum, an aluminum alloy, titanium, a titanium alloy, or a polymer, and wherein the inner body is stainless steel, aluminum, an aluminum alloy, titanium, a titanium alloy, or a polymer.

3. The bowl of claim 1, wherein the outer body or the inner body further comprises a sound deadening material.

4. The bowl of claim 1, wherein the foot comprises a rubber or other polymer.

5. The bowl of claim 1, wherein the bowl is stackable with another bowl.

6. The bowl of claim 1, further comprising a powder coating.

7. The bowl of claim 1, wherein the internal cavity further includes an insulating material.

8. The bowl of claim 1, wherein the outer body has a first thickness and the inner body has a second thickness, and wherein the first thickness is greater than the second thickness.

9. The bowl of claim 1, wherein a ratio of a diameter of the bowl to a height of the bowl is about 2.22 to 1.

10. The bowl of claim 1, wherein the bracket is welded to the circular groove.

11. The bowl of claim 1, wherein the internal cavity is a vacuum chamber.

12. A bowl comprising:
an outer body of a bowl,
wherein the outer body has a u-shaped cross section, the outer body having a bottom configured to support the bowl on a surface, the bottom comprising,
a circular groove,
wherein the circular groove runs along a circumference of the bottom;
a bracket positioned within the circular groove; and
a rubber foot,
wherein the foot is inserted within the groove,
wherein the foot is secured to the circular groove by the bracket, and
wherein the bracket is welded to the bottom of the bowl;
an inner body of the bowl,
wherein the inner body is concave and dome-shaped, the inner body configured to hold a liquid or solid,
wherein the inner body further comprises a lip,
wherein the inner body lip is welded to an upper edge of the outer body, and
wherein a connection formed between the upper edge of the outer body and the inner body lip is seamless; and an internal cavity,
wherein the internal cavity is formed by the outer body and inner body, and
wherein the internal cavity is insulative,
wherein the a ratio of a diameter of the bowl to a height of the bowl is about 2.22 to 1,
wherein the outer body is stainless steel, and
wherein the inner body is stainless steel.

13. The bowl of claim 12, wherein the internal cavity is a vacuum chamber.

14. A method of forming a bowl comprising:
forming an outer body of a bowl, wherein the outer body has a u-shaped cross section, the outer body having a bottom configured to support the bowl on a surface, the bottom comprising a circular groove around a circumference of the bottom and a bracket within the circular groove, wherein a foot is inserted within the groove, and wherein the foot is secured to the circular groove by the bracket;
forming an inner body of the bowl, wherein the inner body is concave and dome-shaped, the inner body configured to hold a liquid or solid, wherein the inner body is connected to an upper edge of the outer body, wherein the inner body further comprises a lip, wherein the inner body lip is welded to an upper edge of the outer body, wherein a seamless connection is formed between the upper edge of the outer body and the inner body lip; and
forming an internal cavity, wherein the internal cavity is formed by the outer body and inner body, and wherein the internal cavity is insulative.

15. The method of claim 14, wherein the outer body is stainless steel, aluminum, an aluminum alloy, titanium, a titanium alloy, or a polymer, and wherein the inner body is stainless steel, aluminum, an aluminum alloy, titanium, a titanium alloy, or a polymer.

16. The method of claim 14, wherein the outer body has a first thickness and the inner body has a second thickness, and wherein the first thickness is greater than the second thickness.

17. The method of claim 14, wherein a ratio of a diameter of the bowl to a height of the bowl is about 2.22 to 1.

18. The method of claim 14, wherein the foot comprises a rubber or other polymer.

19. The method of claim 14, wherein the bracket is welded to the circular groove.

20. The method of claim 14 further comprising forming a vacuum in the internal cavity.

* * * * *

UNITED STATES PATENT AND TRADEMARK OFFICE
CERTIFICATE OF CORRECTION

PATENT NO. : 10,729,261 B2
APPLICATION NO. : 16/146692
DATED : August 4, 2020
INVENTOR(S) : Ellison et al.

Page 1 of 1

It is certified that error appears in the above-identified patent and that said Letters Patent is hereby corrected as shown below:

In the Specification

Column 3, Detailed Description, Line 13:
Delete "101" and insert --100--

Column 3, Detailed Description, Line 36:
Delete "101" and insert --100--

Column 4, Detailed Description, Line 9:
Delete "5" and insert --107--

Signed and Sealed this
Seventeenth Day of November, 2020

Andrei Iancu
*Director of the United States Patent and Trademark Office*